United States Patent
Gutowski et al.

(10) Patent No.: US 10,611,214 B2
(45) Date of Patent: Apr. 7, 2020

(54) SUPPLEMENTAL HEATING SUBSYSTEM AND METHOD FOR A VEHICLE CLIMATE CONTROL SYSTEM

(71) Applicant: FORD GLOBAL TECHNOLOGIES, LLC, Dearborn, MI (US)

(72) Inventors: Alan Gutowski, Dearborn Heights, MI (US); Curtis Mark Jones, Wixom, MI (US); Tina Marie Maurer, Troy, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 268 days.

(21) Appl. No.: 14/679,101

(22) Filed: Apr. 6, 2015

(65) Prior Publication Data
US 2016/0288616 A1    Oct. 6, 2016

(51) Int. Cl.
B60H 1/22    (2006.01)

(52) U.S. Cl.
CPC ... B60H 1/2218 (2013.01); *B60H 2001/2237* (2013.01)

(58) Field of Classification Search
CPC .............. B60H 1/2218; B60H 2001/2237
See application file for complete search history.

(56) References Cited

U.S. PATENT DOCUMENTS

| | | | | |
|---|---|---|---|---|
| 5,427,313 A | * | 6/1995 | Davis, Jr. | B60H 1/00814 165/42 |
| 5,516,041 A | * | 5/1996 | Davis, Jr. | B60H 1/00785 165/43 |
| 5,549,152 A | * | 8/1996 | Davis, Jr. | G05D 23/1917 165/201 |
| 5,553,776 A | * | 9/1996 | Davis, Jr. | B60H 1/00735 236/44 C |
| 5,570,838 A | * | 11/1996 | Davis, Jr. | B60H 1/00785 236/44 C |
| 5,579,994 A | * | 12/1996 | Davis, Jr. | B60H 1/00735 236/49.3 |

(Continued)

FOREIGN PATENT DOCUMENTS

| | | |
|---|---|---|
| DE | 19960562 C1 | 12/2000 |
| DE | 10110558 A1 | 9/2002 |

(Continued)

OTHER PUBLICATIONS

English machine translation for DE10002217.

(Continued)

*Primary Examiner* — Avinash A Savani
*Assistant Examiner* — Deepak A Deean
(74) *Attorney, Agent, or Firm* — David Coppielle; King & Schickli, PLLC

(57) ABSTRACT

A supplemental heating subsystem is provided for a vehicle climate control system including an air flow control door. The supplemental heating subsystem includes a controller configured to control the supplemental heating subsystem, a supplemental heating element responsive to the controller and an actuator for positioning the door responsive to the controller. In operation, the position of the door is controlled to improve the operating efficiency of the supplemental heating element.

9 Claims, 4 Drawing Sheets

(56) References Cited

U.S. PATENT DOCUMENTS

| | | | |
|---|---|---|---|
| 5,755,378 A * | 5/1998 | Dage | B60H 1/00814 165/204 |
| 5,755,380 A * | 5/1998 | Virey | B60H 1/034 237/12.3 R |
| 5,937,940 A * | 8/1999 | Davis, Jr. | B60H 1/00735 165/202 |
| 6,040,561 A | 3/2000 | Murty | |
| 6,124,570 A | 9/2000 | Ebner et al. | |
| 6,347,746 B1 * | 2/2002 | Dage | B60H 1/00785 236/44 C |
| 6,598,671 B1 | 7/2003 | Zeng et al. | |
| 6,659,360 B1 * | 12/2003 | Schaefer | B60H 1/00971 236/46 R |
| 8,560,127 B2 | 10/2013 | Leen et al. | |
| 8,740,104 B2 | 6/2014 | Bigler et al. | |
| 9,174,513 B2 * | 11/2015 | Lee | B60H 1/2218 |
| 2009/0071178 A1 * | 3/2009 | Major | B60H 1/00278 62/239 |
| 2010/0116485 A1 * | 5/2010 | Hiyama | B60H 1/00271 165/202 |
| 2011/0016896 A1 * | 1/2011 | Oomura | B60H 1/00785 62/155 |
| 2011/0067422 A1 * | 3/2011 | Ichishi | B60H 3/0085 62/176.1 |
| 2012/0122000 A1 * | 5/2012 | Lee | B60H 1/2218 429/429 |
| 2013/0192271 A1 * | 8/2013 | Barnhart | F25B 21/04 62/3.3 |
| 2013/0213631 A1 * | 8/2013 | Ichishi | B60H 1/00021 165/202 |
| 2013/0292482 A1 * | 11/2013 | Hashigaya | B60H 1/00007 237/28 |

FOREIGN PATENT DOCUMENTS

| | | |
|---|---|---|
| EP | 11176038 A2 | 1/2002 |
| EP | 2402209 B1 | 6/2013 |

OTHER PUBLICATIONS

English machine translation for DE10110558.
English machine translation for DE19960562.
English machine translation for EP1176038.
English machine translation for EP2402209.

* cited by examiner

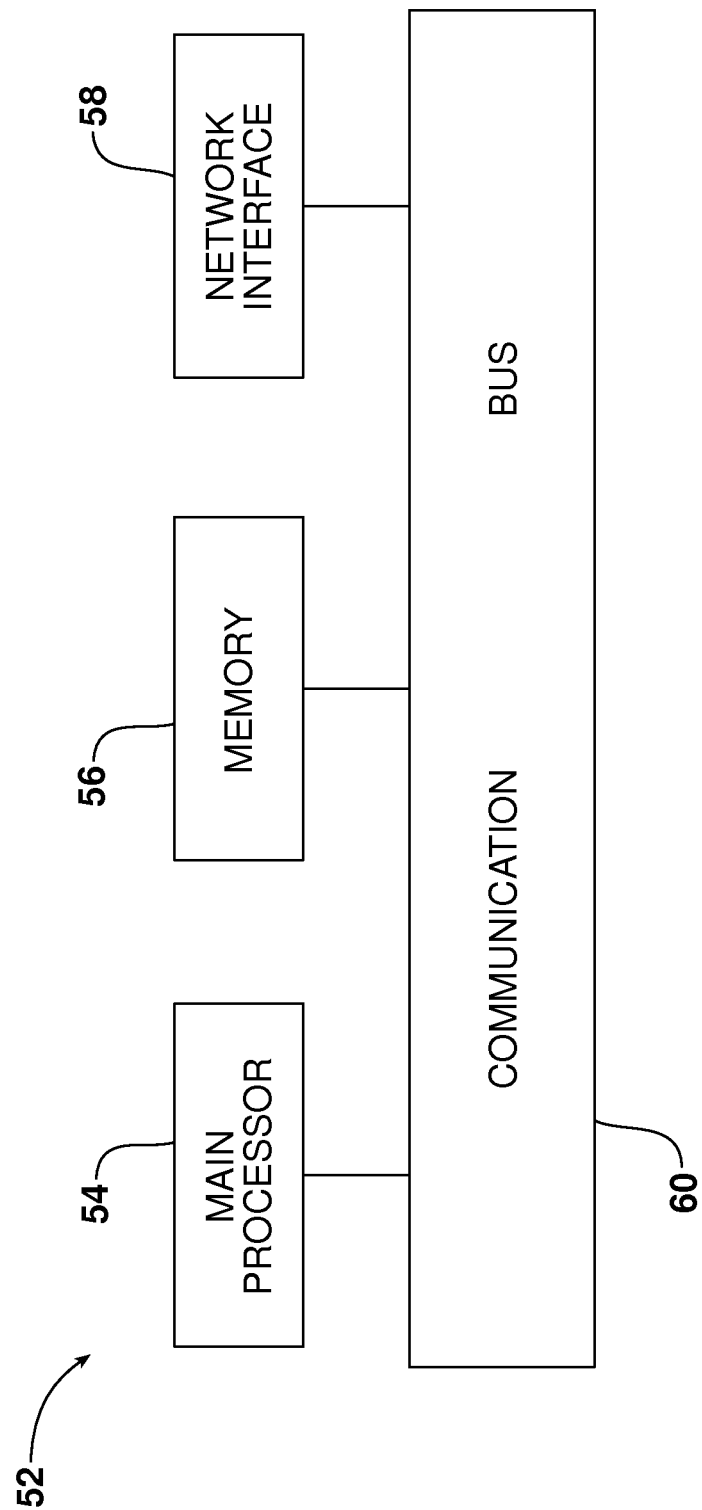

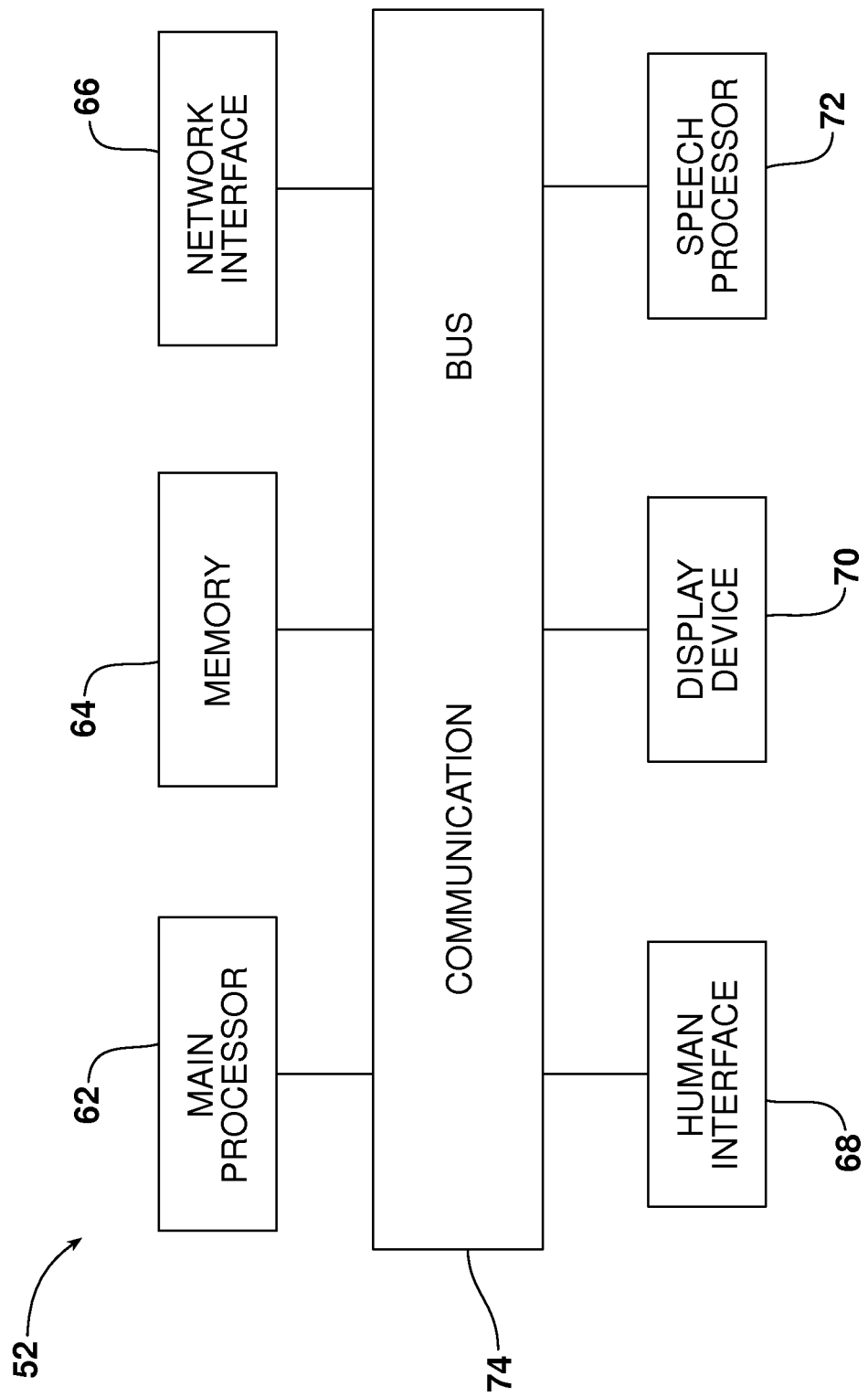

SUPPLEMENTAL HEATING SUBSYSTEM AND METHOD FOR A VEHICLE CLIMATE CONTROL SYSTEM

TECHNICAL FIELD

This document relates generally to the motor vehicle field and, more particularly, to a supplemental heating subsystem and related supplemental heating method for a vehicle climate control system.

BACKGROUND

The broad concept of supplementing a standard or traditional climate control system for a motor vehicle is old in the art. For example, U.S. Pat. No. 6,124,570 discloses a heating and air-conditioning system for motor vehicles incorporating a supplemental electric heating element that is activated when the climate controls are positioned for maximum heating output.

This document relates to a new and improved supplemental heating subsystem and supplemental heating method incorporating a controller in the form of a computing device that provides for more effective and efficient supplemental heating for the motor vehicle.

SUMMARY

In accordance with the purposes and benefits described herein, a supplemental heating subsystem is provided for a vehicle climate control system that includes an air flow control door. That supplemental heating subsystem includes a controller configured to control the supplemental heating, a supplemental heating element responsive to the controller and an actuator for positioning the air flow control door responsive to the controller. In operation, the controller responsive actuator displaces the door as necessary to improve the operating efficiency of the supplemental heating element. The air flow control door may comprise a fresh air inlet door, a temperature blend door or both a fresh air inlet door and a temperature blend door.

In one possible embodiment, the subsystem further includes an ambient temperature sensor providing ambient temperature data to the controller. In one possible embodiment, the subsystem includes a cabin temperature sensor providing cabin temperature data to the controller. In one possible embodiment, the subsystem includes a solar radiation sensor providing solar radiation data to the controller.

In one possible embodiment, the subsystem includes an engine coolant temperature sensor providing engine coolant temperature data to the controller. In yet another possible embodiment, the subsystem includes an ambient humidity sensor providing ambient humidity data to the controller. In still another possible embodiment, the subsystem includes a cabin humidity sensor providing cabin humidity data to the controller.

In still another possible embodiment, the controller includes a temperature set point component for receiving temperature set point data from the vehicle climate control system. In yet another possible embodiment, the controller includes a door position component for receiving door position data from the vehicle climate control system. In still another possible embodiment, the controller includes a blower speed component for receiving blower speed data from the vehicle climate control system. Thus, in one possible embodiment, the controller provides more efficient and effective operation of the supplemental heating element in response to data input from the ambient temperature sensor, the cabin temperature sensor, the solar radiation sensor, the engine coolant temperature sensor and the vehicle climate control system.

In accordance with an additional aspect, a method is provided for delivering supplemental heating to a vehicle climate control system. That method may be broadly described as comprising the steps of monitoring ambient temperature by means of an ambient temperature sensor and providing ambient temperature data to the controller, activating a supplemental heating element by means of the controller and displacing an air flow control door of the vehicle climate control system by a controller controlled actuator when the supplemental heating element is activated.

In one possible embodiment, the method further includes monitoring cabin temperature by means of a cabin temperature sensor and providing cabin temperature data to the controller. In one possible embodiment, the method further includes monitoring solar radiation by means of a solar radiation sensor and providing solar radiation data to the controller.

In one possible embodiment, the method further includes monitoring engine coolant temperature by means of an engine coolant temperature sensor and providing engine coolant temperature data to the controller. In yet another possible embodiment, the method includes monitoring ambient humidity by means of an ambient humidity sensor and providing ambient humidity data to the controller. In still another possible embodiment, the method includes monitoring cabin humidity by means of a cabin humidity sensor and providing cabin humidity data to the controller.

In still another possible embodiment, the method includes providing temperature set point data to a temperature set point component of the controller. In yet another possible embodiment, the method includes providing door position data to a door position component of the controller. In still another possible embodiment, the method includes providing blower speed data to a blower speed component of the controller.

In the following description, there are shown and described several preferred embodiments of the supplemental heating subsystem and method. As it should be realized, the supplemental heating subsystem and method are capable of other, different embodiments and their several details are capable of modification in various, obvious aspects all without departing from the subsystem and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the supplemental heating subsystem and method and together with the description serve to explain certain principles thereof. In the drawing figures:

FIG. 3 is a block diagram of one possible embodiment of controller utilized in the supplemental heating subsystem.

FIG. 4 is a schematic block diagram of another possible embodiment of controller utilized in the supplemental heating subsystem.

Reference will now be made in detail to the present preferred embodiments of the supplemental heating subsystem, examples of which are illustrated in the accompanying drawing figures.

DETAILED DESCRIPTION

Figure 1:
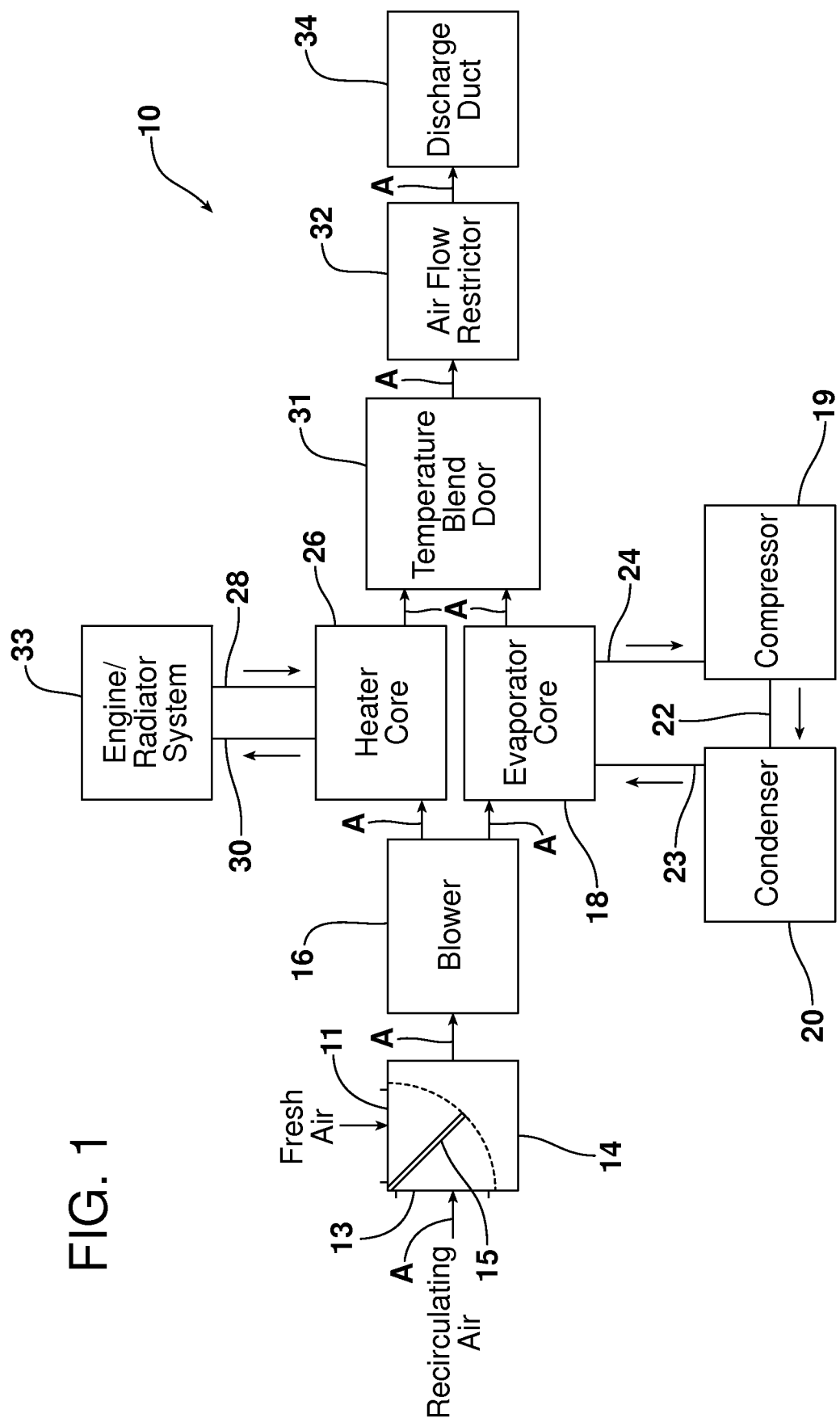
FIG. 1 is a schematic block diagram of a motor vehicle climate control system of the type incorporating the supplemental heating that is the subject matter of this document.

Reference is now made to FIG. 1 which schematically illustrates a motor vehicle climate control system 10. For purposes of this description the action arrows A represent the airflow conduits of the vehicle climate control system 10.

As illustrated, the system 10 includes an intake manifold or duct 14. The intake duct 14 includes a fresh air inlet 11, a recirculating air inlet 13 and an inlet door 15 for controlling the flow of fresh air and recirculating air into the inlet duct. As should be appreciated, the door 15 may be positioned to close off and seal the fresh air inlet 11 and allow only recirculating air into the inlet duct 14 or close off and seal the recirculating air inlet 13 and allow only fresh air into the inlet duct. Alternatively, the door 15 may also be provided in any number of intermediate positions to allow a varying mixture of fresh air and recirculating air into the inlet duct 14 if desired.

A blower 16 draws air from the intake duct 14 and then forces that air through the evaporator core 18 and the heater core 26. The air passing through the evaporator core 18 is cooled and dehumidified through heat exchange with a refrigerant fluid of the vehicle air-conditioning system. As is known in the art, that refrigerant fluid flows between a compressor 19, a condenser 20 and the evaporator core 18 through the lines 22, 23, 24. More specifically, cool refrigerant is delivered from the condenser 20 to the evaporator core 18 through the line 23. That cool refrigerant dehumidifies and absorbs heat from the air forced through the evaporator core 18 by the blower 16 and then is returned to the compressor 19 through the line 24. After compression, the refrigerant is routed through the line 22 to the condenser 20 where it is again cooled before being recycled back to the evaporator core 18.

The air passing through the heater core 26 is heated through heat exchange with a hot engine coolant. As should be appreciated, the heater core 26 is connected by lines 28 and 30 to the engine and radiator system 33. In winter, hot engine coolant is pumped through the line 28 from the engine to the heater core 26 where it heats the air being forced through the heater core by means of heat exchange before being returned to the engine/radiator system through the line 30.

Air from the evaporator core 18 and heater core 26 is forced by the blower 16 through the airflow restrictor 32 to one or more of a number of discharge ducts 34 provided in the vehicle so as to clear fog from the windscreen and/or heat the vehicle cabin. In summer, the air flow either bypasses the heater core 26 or no hot engine coolant is circulated through the heater core from the engine/radiator system 33. A temperature blend door 31 downstream from the evaporator core 18 and heater core 26 controls air flow from the evaporator core and heater core to the airflow restrictor 32. That temperature blend door 31 may be positioned to seal off any air flow from the evaporator core 18 or any air flow from the heater core 26. The temperature blend door 31 may also assume any number of intermediate positions blending air flow from both cores 18, 26 as desired.

Figure 2:
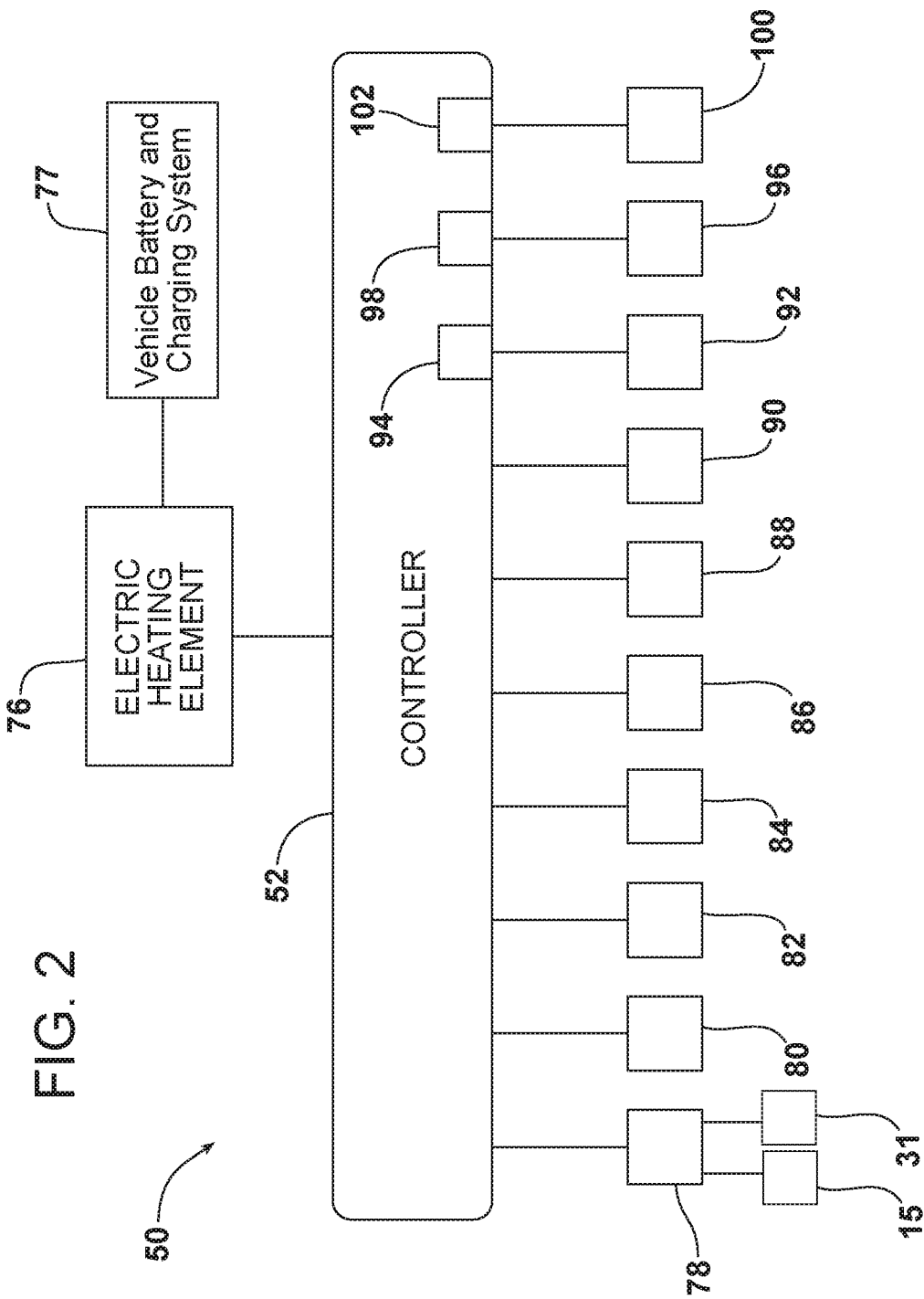
FIG. 2 is a schematic block diagram of the supplemental heating subsystem.

This document relates to a supplemental heating subsystem 50 for supplementing the heat provided by the vehicle climate control system 10 at any desired time including particularly prior to the warming of the refrigerant running through the engine/radiator system 33 and heater core 26. That supplemental heating subsystem 50 is schematically illustrated in FIG. 2. As illustrated, the supplemental heating subsystem 50 includes a controller 52 that is configured to control the supplemental heating subsystem. That controller 52 may comprise a dedicated microprocessor or an electronic control unit (ECU) running appropriate control software. Thus, as illustrated in FIG. 3, in one possible embodiment, the controller 52 includes at least one processor 54, at least one memory 56 and a network interface 58 that all communicate with each other over a communication bus 60.

In another possible embodiment illustrated in FIG. 4, the controller 52 includes one or more processors 62, one or more memories 64, one or more network interfaces 66, a human interface 68, a display device such as a multi-function display with touchscreen capability 70 and even a speech processor 72 that all communicate with each other over a communication bus 74. In this embodiment, the human interface 68 and the display device 70 allow the operator to input climate control commands and review climate control system status as desired. The speech processor 72 may even allow for voice control of the vehicle climate control system 10 and/or the supplemental heating subsystem 50.

As further illustrated in FIG. 2, the supplemental heating subsystem also includes a supplemental electrical heating element 76 that is supplied with electrical energy from the vehicle battery and charging system 77. As further illustrated in FIG. 2, the supplemental heating subsystem 50 also includes an actuator 78 for positioning an air flow control door 15, 31 in response to commands from the controller 52. In order to provide maximum efficiency of operation of the supplemental heating subsystem 50 and obtain maximum benefit of the heat generated by the supplemental heating element 76, the controller 52 is configured to: (a) close the fresh air inlet 11 by means of the inlet door 15, (b) position the temperature blend door 31 to seal off air flow from the heater core 26 or (c) close the fresh air inlet with the fresh air inlet door and seal off air flow from the heater core with the temperature blend door when the supplemental heating element is activated.

In the illustrated embodiment, the supplemental heating subsystem 50 further includes an ambient temperature sensor 80 for providing ambient temperature data to the controller 52. In addition, the subsystem 50 includes a cabin temperature sensor 82 for providing cabin temperature data to the controller 52.

Still further, the subsystem 50 includes a solar radiation sensor 84 for providing solar radiation data to the controller 52. Further, the subsystem 50 includes an engine coolant temperature sensor 86 for providing engine coolant temperature data to the controller 52. In addition, the subsystem 50 includes an ambient humidity sensor 88 and a cabin humidity sensor 90 for providing, respective, ambient humidity and cabin humidity data to the controller 52.

As also illustrated in FIG. 2, the controller 52 includes a temperature set point component 94 for receiving temperature set point data from a temperature set point interface 92 which a vehicle operator utilizes to select a desired cabin temperature for the motor vehicle. In addition, the controller 52 includes a blower speed component 98 for receiving blower speed data from a blower speed interface 96 which the vehicle operator utilizes to set the speed of the blower 16 of the motor vehicle climate control system 10. Still further, the controller 52 includes a door position component 102 for receiving door position data from an inlet door and/or temperature blend door position sensor 100 or other device utilized to monitor the position of the inlet door 15 and/or temperature blend door 31.

The illustrated supplemental heating subsystem 50 functions in accordance with a method of providing supplemental heating to the vehicle climate control system 10. That method may be broadly described as comprising the steps of monitoring ambient temperature by means of the ambient temperature sensor 80 and providing ambient temperature data to the controller 52. In addition, the method includes the step of activating the supplemental heating element 76 by means of the controller and displacing the air flow control door 15 and/or 31 by of means of the controller controlled actuator 78 when the supplemental heating element is activated as necessary in order to maximize the operating efficiency and effectiveness of the supplemental heating element.

The method further includes monitoring the cabin temperature by means of the cabin temperature sensor 82 and providing cabin temperature data to the controller 52 as well as monitoring solar radiation by means of the solar radiation sensor 84 and providing solar radiation data to the controller. In addition, the method includes monitoring engine coolant temperature by means of the engine coolant temperature sensor 86 and providing engine coolant temperature data to the controller 52.

Further, the method also includes monitoring ambient humidity by means of the ambient humidity sensor 88 and cabin humidity, by means of the cabin humidity sensor 90 and providing ambient and cabin humidity data to the controller 52.

In addition, temperature set point data is provided to the temperature set point component 94 of the controller 52, blower speed data is provided to the blower speed component 98 of the controller and door position data is provided to the door position component 102 of the controller. The controller 52 is configured to provide more efficient and effective operation of the supplemental heating element 76 in response to the data input from the various sensors and interfaces 80, 82, 84, 86, 88, 90, 92, 96, 100.

In one possible embodiment, the temperature blend door 31 closes and seals off airflow from the heater core 26 the entire time the engine coolant temperature remains below a predetermined target temperature and the supplemental heating element 76 is activated. This prevents the still cold engine coolant from cooling the air and reducing the operating efficiency and effectiveness of the supplemental heating element 76. When the data input from the various sensors and interfaces 80, 82, 84, 86, 88, 90, 92, 96, 100 meets predetermined criteria, and supplemental heat requirements decrease, electrical power to the supplemental heating element 76 will be dialed back via multiple relays or pulse width modulation (PWM). Once the power to the supplemental heating element 76 has been reduced to zero, the cabin temperature will be maintained exclusively via heat exchange with the engine coolant in the heater core 26 by way of the temperature blend door 31 and inlet door 15 will be freed to allow the opening of the fresh air inlet 11 if the operator desires to circulate fresh air into the cabin of the motor vehicle.

While the illustrated embodiment of the supplemental heating system 50 includes the ambient temperature sensor 80, the cabin temperature sensor 82, the solar radiation sensor 84, the engine coolant sensor 86, the ambient humidity sensor 88 and the cabin humidity sensor 90 as well as the temperature set point component 94, the blower speed component 98 and the inlet door position component 102, it should be appreciated that the supplemental heating subsystem 50 may include any of various combinations of these sensors and components depending upon the particular vehicle application.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A supplemental heating subsystem for use in association with a vehicle climate control system defining at least one airflow path and including a heater core connected to an engine cooled by an engine coolant and radiator system, said heater core in thermal communication with the engine coolant, an evaporator core, and an air flow control door, said supplemental heating subsystem comprising:
   a controller;
   an engine coolant temperature sensor providing engine coolant temperature data to said controller;
   a supplemental heating element responsive to said controller;
   an inlet door:
   a temperature blend door; and
   an actuator configured for positioning said inlet door and said temperature blend door of the vehicle climate control system responsive to said controller to alter the at least one airflow path of the vehicle climate control system;
   wherein the controller is configured to (a) control the supplemental heating element in response to engine coolant temperature data from the engine coolant temperature sensor, thereby improving the efficiency of the supplemental heating element and (b) close the fresh air inlet with the inlet door and seal off air flow from the heater core with the temperature blend door when the supplemental heating element is activated.

2. The subsystem of claim 1, further including an ambient temperature sensor for providing ambient temperature data to said controller.

3. The subsystem of claim 2, further including a cabin temperature sensor for providing cabin temperature data to said controller.

4. The subsystem of claim 3, further including a solar radiation sensor for providing solar radiation data to said controller.

5. The subsystem of claim 4, further including an ambient humidity sensor for providing ambient humidity data to said controller.

6. The subsystem of claim 5, further including a cabin humidity sensor for providing cabin humidity data to said controller.

7. The subsystem of claim 6, wherein said controller includes a temperature set point component for receiving temperature set point data from the vehicle climate control system.

8. The subsystem of claim 7, wherein said controller includes a door position component for receiving door position data from the vehicle climate control system.

9. The subsystem of claim 8, wherein said controller includes a blower speed component for receiving blower speed data from the vehicle climate control system whereby said controller improves operation of said supplemental heating element by reducing electrical power to said supplemental heating element in response to data input from said ambient temperature sensor, said cabin temperature sensor, said solar radiation sensor, said engine coolant temperature sensor and the vehicle climate control system.

\* \* \* \* \*